US008228392B2

(12) United States Patent
Siddiqui et al.

(10) Patent No.: US 8,228,392 B2
(45) Date of Patent: Jul. 24, 2012

(54) METHOD AND UNIT FOR GENERATING HIGH DYNAMIC RANGE IMAGE AND VIDEO FRAME

(75) Inventors: Muhammad Siddiqui, Esslingen am Neckar (DE); Muhammad Atif, Stuttgart (DE); Klaus Zimmermann, Deizisau (DE)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 12/717,473

(22) Filed: Mar. 4, 2010

(65) Prior Publication Data

US 2010/0245613 A1    Sep. 30, 2010

(30) Foreign Application Priority Data

Mar. 31, 2009    (EP) .................................... 09004726

(51) Int. Cl.
*H04N 5/225*    (2006.01)
*H04N 5/228*    (2006.01)
(52) U.S. Cl. ................... 348/216.1; 348/222.1
(58) Field of Classification Search ............... 348/216.1, 348/218.1, 222.1, 239
See application file for complete search history.

(56) References Cited

U.S. PATENT DOCUMENTS

| | | | |
|---|---|---|---|
| 5,818,977 A * | 10/1998 | Tansley | 382/294 |
| 6,222,882 B1 | 4/2001 | Lee et al. | |
| 7,009,636 B2 * | 3/2006 | Liu et al. | 348/208.1 |
| 7,239,805 B2 * | 7/2007 | Uyttendaele et al. | 396/222 |
| 7,612,804 B1 * | 11/2009 | Marcu et al. | 348/222.1 |
| 7,626,614 B1 * | 12/2009 | Marcu | 348/222.1 |
| 2004/0008267 A1 | 1/2004 | Chen et al. | |
| 2007/0242900 A1 | 10/2007 | Chen et al. | |
| 2010/0271498 A1 * | 10/2010 | Hwang et al. | 348/222.1 |
| 2010/0271512 A1 * | 10/2010 | Garten | 348/239 |
| 2010/0328315 A1 * | 12/2010 | Siddiqui et al. | 345/440 |

OTHER PUBLICATIONS

Xuemin Chen, et al., "Brightness and Contrast Compensated Prediction Coding: Extension to Video VM.", International Organisation for Standardisation, ISO/IEC JTC1/SC29/WG11, Coding of Moving Pictures and Associated Audio Information, MPEG96/M0969, XP030030363, Jul. 1996, pp. 1-8.
G.A. Thomas, "Motion Estimation for MPEG-2 Coding using 'True' Vectors", Research and Development Report, Research and Development, Policy and Planning, The British Broadcasting Corporation, BBC RD Nov. 1996, 19 pages.
Sing Bing Kang, et al., "High Dynamic Range Video", Interactive Visual Media Group, Microsoft Research, 2003, pp. 319-325.
Paul E. Debevec, et al., "Recovering High Dynamic Range Radiance Maps from Photographs", Computer Science Division, University of California at Berkeley, 10 pages.
E. Reinhard, et al., "High Dynamic Range Imaging: Acquisition, Display, and Image-Based Lighting", Morgan Kaufmann, Aug. 2005, pp. 117-122, 187-191, 223-224.
European Office Action issued Apr. 8, 2011, in Patent Application No. 09 004 726.7.
U.S. Appl. No. 12/797,216, filed Jun. 9, 2010, Siddiqui, et al.

* cited by examiner

*Primary Examiner* — Timothy J Henn
(74) *Attorney, Agent, or Firm* — Oblon, Spivak, McClelland, Maier & Neustadt, L.L.P.

(57) ABSTRACT

An embodiment of the invention relates to a method for High Dynamic Range (HDR) image creation by generating a mean difference curve for use in aligning the images of a sequence of images taken with different exposures, wherein the difference in exposure might derive from a difference in exposure time or a difference in aperture size. A further embodiment of the invention relates to a method for HDR image creation by generating images with different exposures from a single image. A further embodiment of the invention relates to a method for HDR video creation by generating frames with different exposures from a single frame.

12 Claims, 9 Drawing Sheets

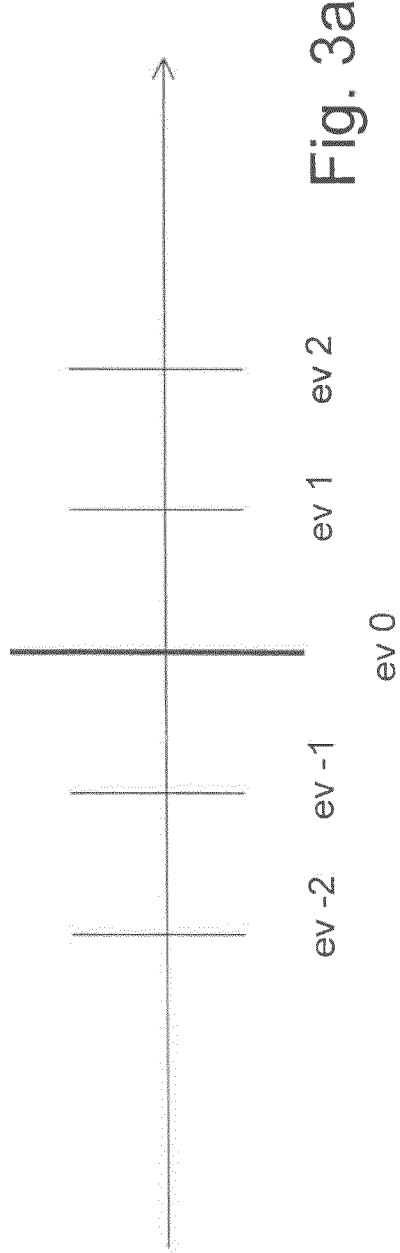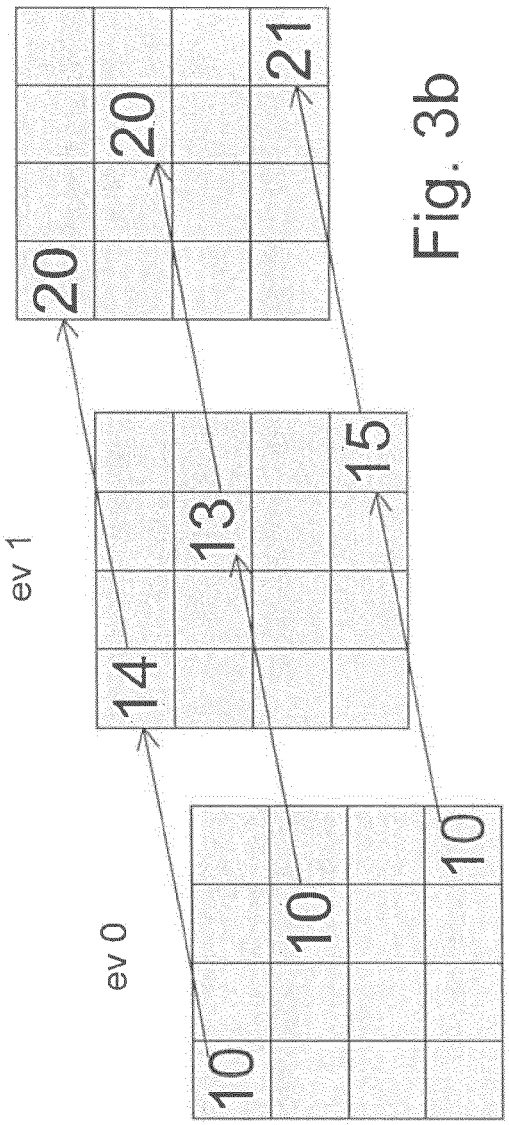

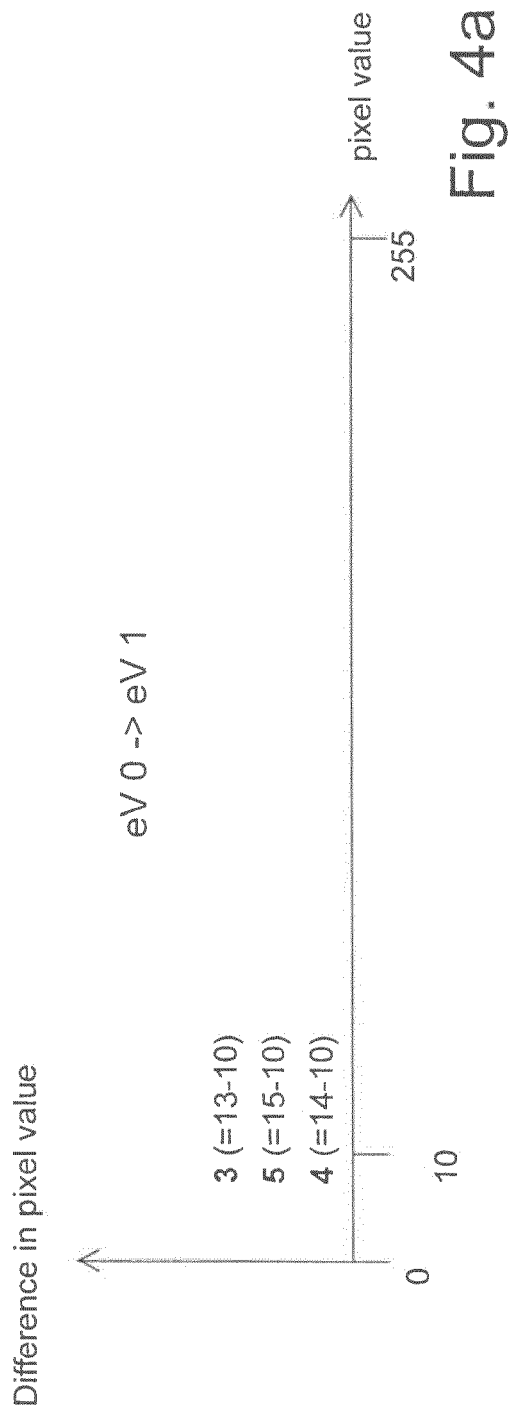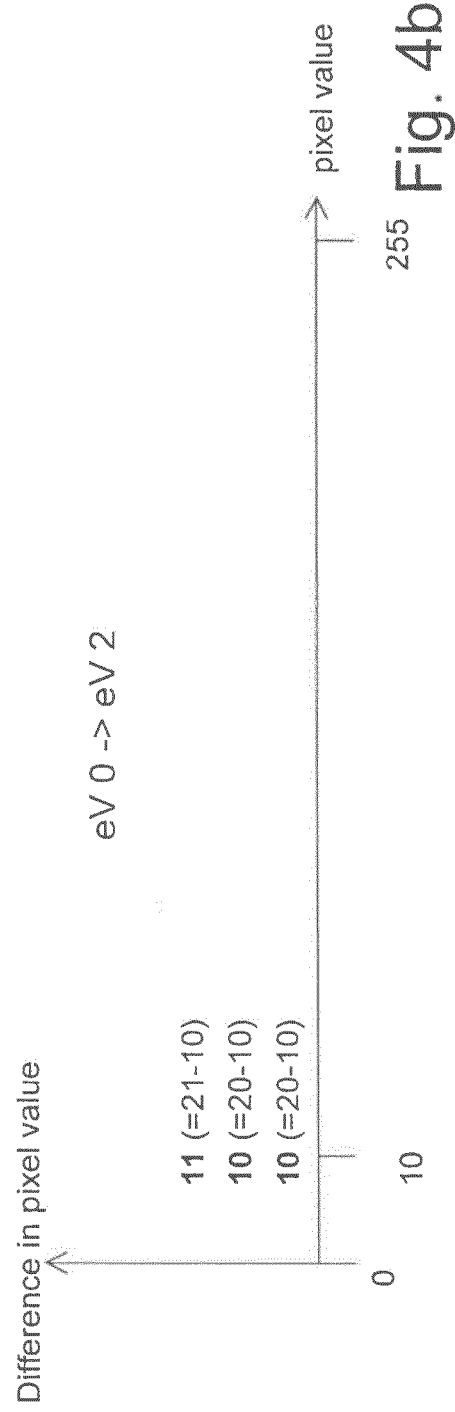

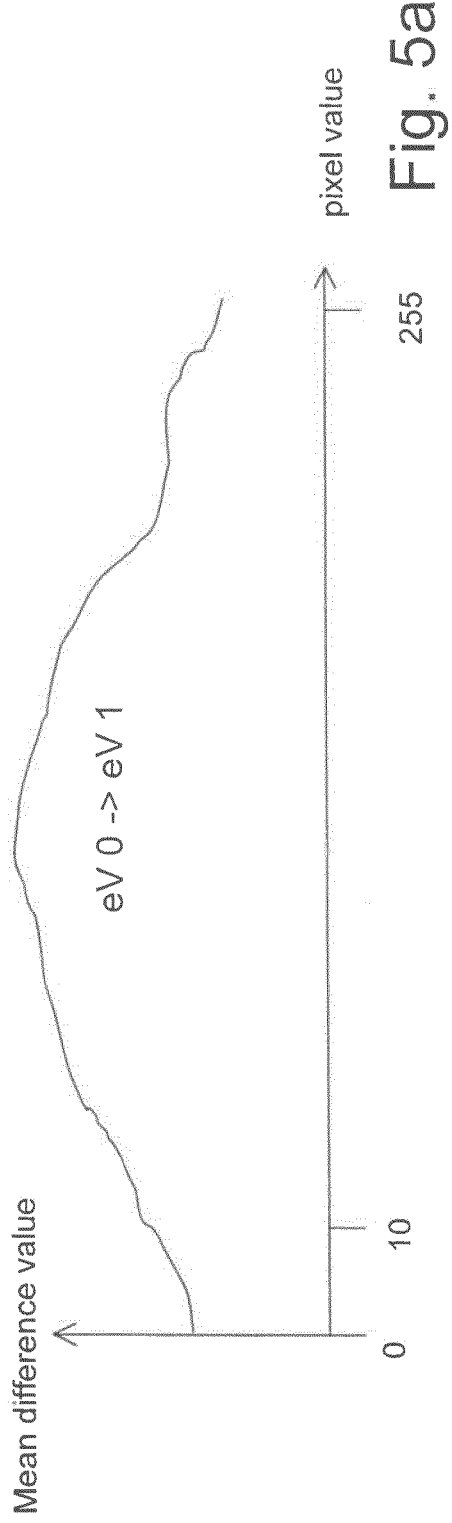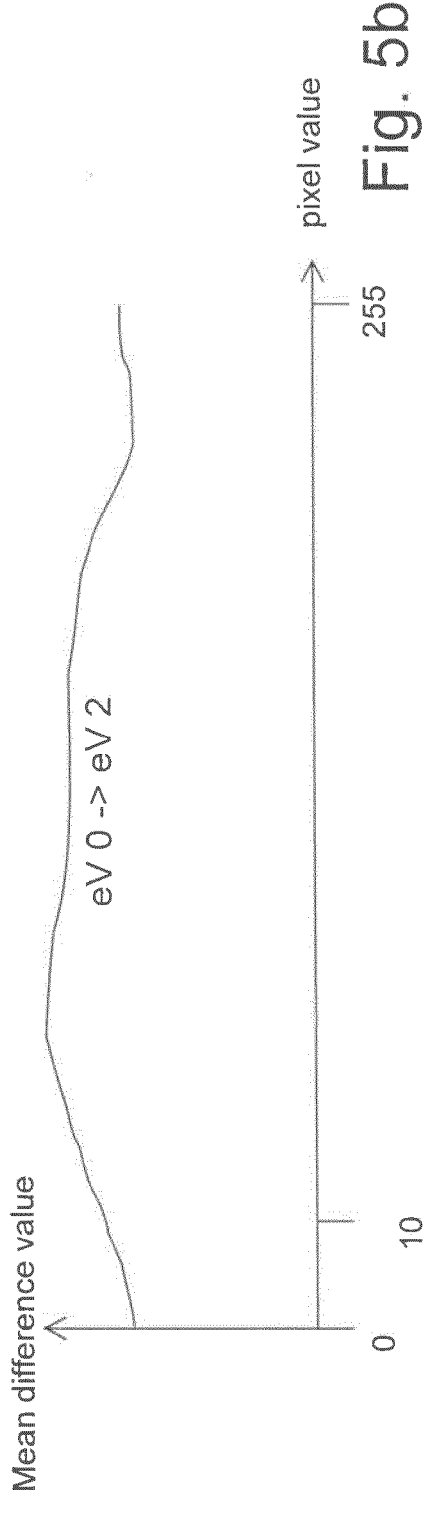

METHOD AND UNIT FOR GENERATING HIGH DYNAMIC RANGE IMAGE AND VIDEO FRAME

An embodiment of the invention relates to a method for High Dynamic Range (HDR) image creation by generating a mean difference curve for use in aligning the images of a sequence of images taken with different exposures. A further embodiment of the invention relates to a method for HDR image creation by generating images with different exposures from a single image. A further embodiment of the invention relates to a method for HDR video creation by generating frames with different exposures from a single frame.

BACKGROUND

In HDR image creation, multiple images are taken at different exposures and then blended in order to have an image with a dynamic range higher than the dynamic range of a single image. Within this blending procedure those images with smaller exposures, which contain more information in bright areas, improve the dynamic range within these bright areas of the image, and other images with higher exposure improve the dynamic range within dark areas. Therefore by blending these images of different exposure the dynamic range of the resulting image can be increased.

However, an image sequence taken with a handheld camera contains global and local motion, wherein global motion derives e.g. from movement of the camera and local motion derives e.g. from movement of objects to be imaged. Thus, for HDR image creation those images should be aligned with each other before blending them. Hereinafter the term luminance is used equivalently to the term radiance.

It is a problem that state of the art methods for motion estimation cannot align images with different exposures efficiently, because there is no linear change in luminance between images taken with different exposures due to non-linear post processing inside the camera after an image is captured.

Conventional motion estimation does not work with non-linear luminance change, since state of the art techniques crop the images, which results in the loss of information and in artifacts, which appear in the aligned images due to motion when applying conventional techniques. Therefore, when using state of the art techniques it is not possible to preserve the dynamic range of an image in all image regions.

In conventional block based motion estimation, a block in the current image is matched with the neighboring blocks in a reference image and the block which has for example least mean absolute difference (MAD) is taken as a predicted block.

Also a method of fading images, in which a global DC of each image is subtracted from each pixel value in calculating the mean absolute difference does not work for images having different exposure because the change in exposure is luminance dependent. Therefore both the conventional method and the method for fading images do not work for the images having different exposures because the change in exposure is luminance dependent.

It has also not been possible so far to generate different exposure images from a single image or to generate different exposure frames from a single frame in HDR video.

Therefore it is an object of the invention to provide a method and unit for improving the generation of high dynamic range image based on a reference among different exposure images so that aligned images of different exposure are created for use in HDR imaging.

BRIEF SUMMARY

The problem is solved by a method according to claim 1, a unit according to claim 8 and a computer readable medium according to claim 12. Further embodiments are defined in the dependent claims.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 3a is a block diagram illustrating the procedure of taking images at different exposures with non-linear changes of the pixel value. FIG. 3b shows, how a pixel value (in the example the considered pixel value is "10") is varied for different exposures. This variation/change in the pixel value can also be considered as a transition between the reference image and one of the n−1 further images with exposure values eV1, eV2, etc.

FIGS. 4a and 4b show arrays of reference values for a transition from reference image with exposure value eV0 to a further image with exposure value eV1 and for a transition to another further image with exposure value ev2.

FIGS. 5a and 5b correspond to the transitions shown in FIGS. 4a and 4b and show the "mean difference value" for each pixel value of the transition of FIG. 4a or 4b.

Figure 7:
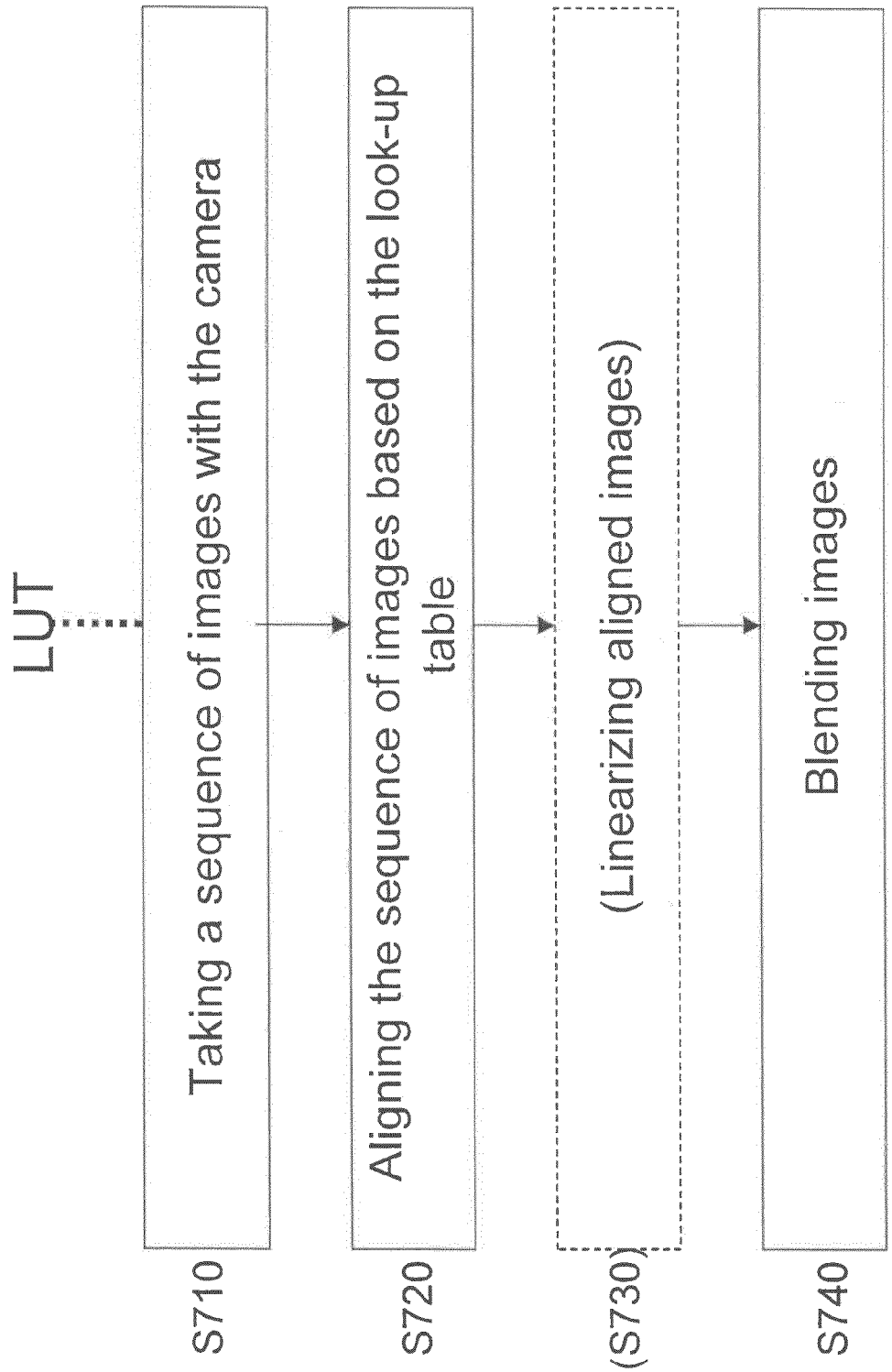
Figure 8:
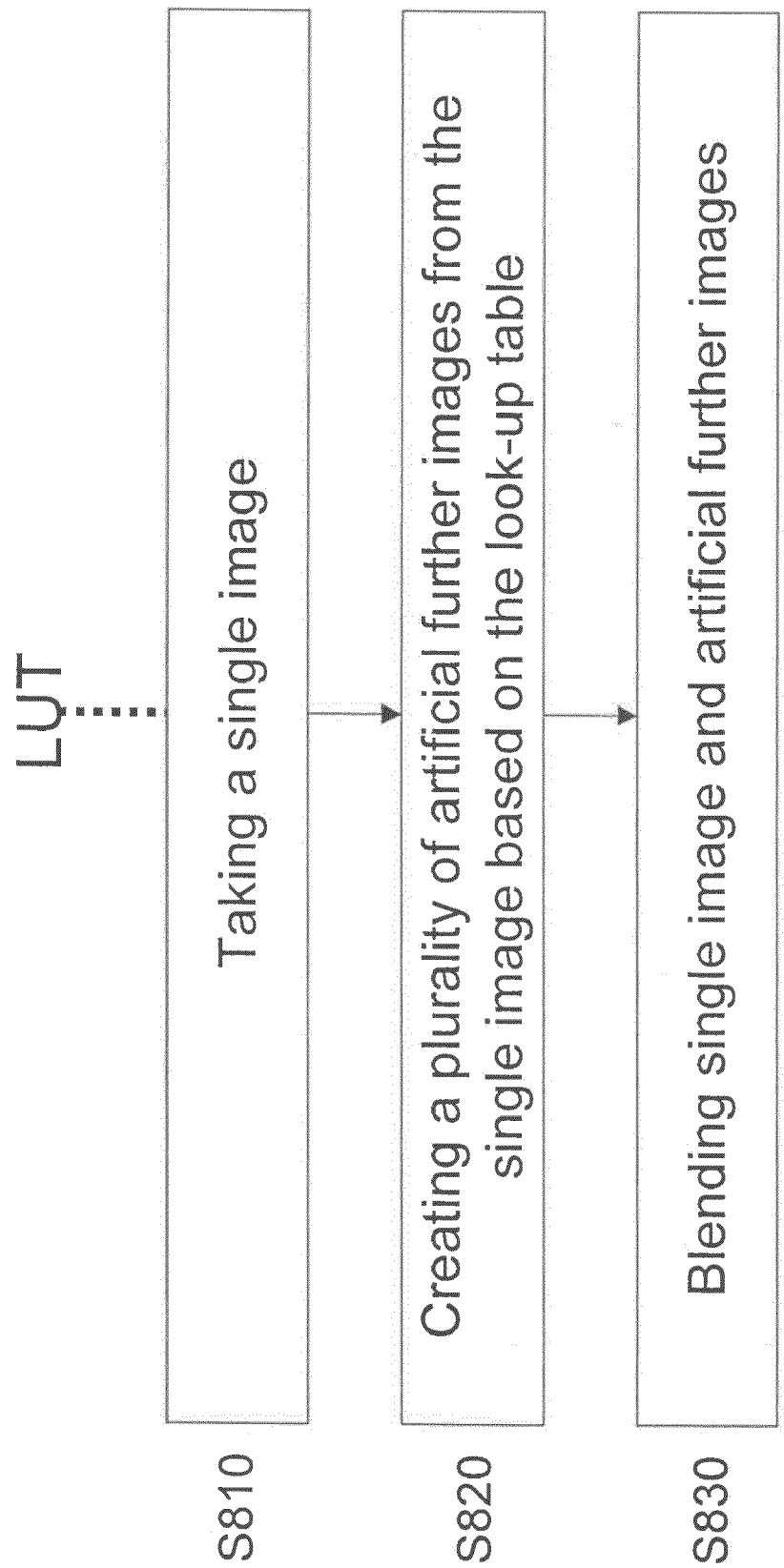

Different uses of the look-up table are illustrated in FIGS. 7 and 8.

Figure 9:
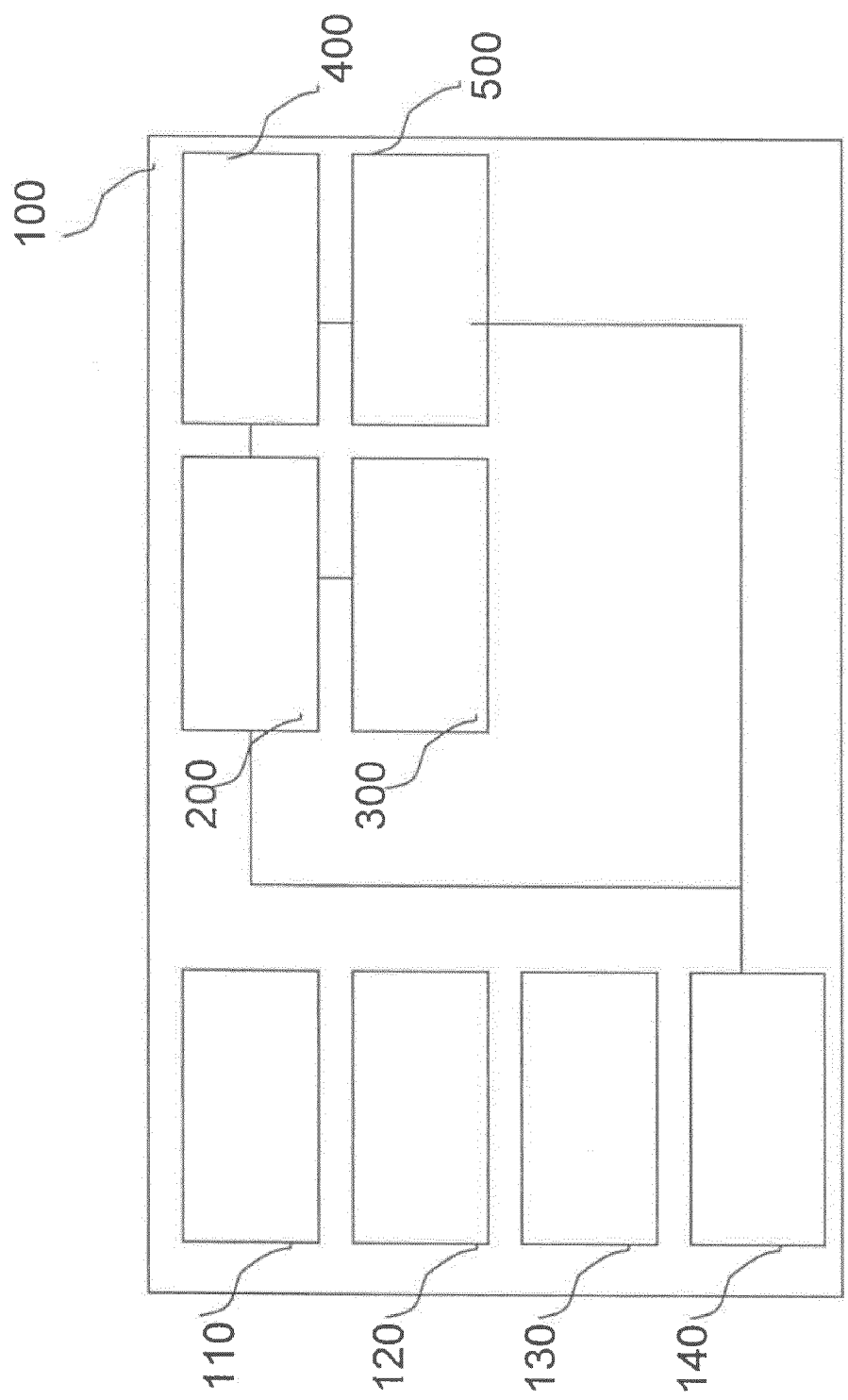

FIG. 9 shows a generation unit for generating a high dynamic range image.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is also to be understood that the features of the various embodiments described herein may be combined with each other, unless specifically noted otherwise.

Figure 1:
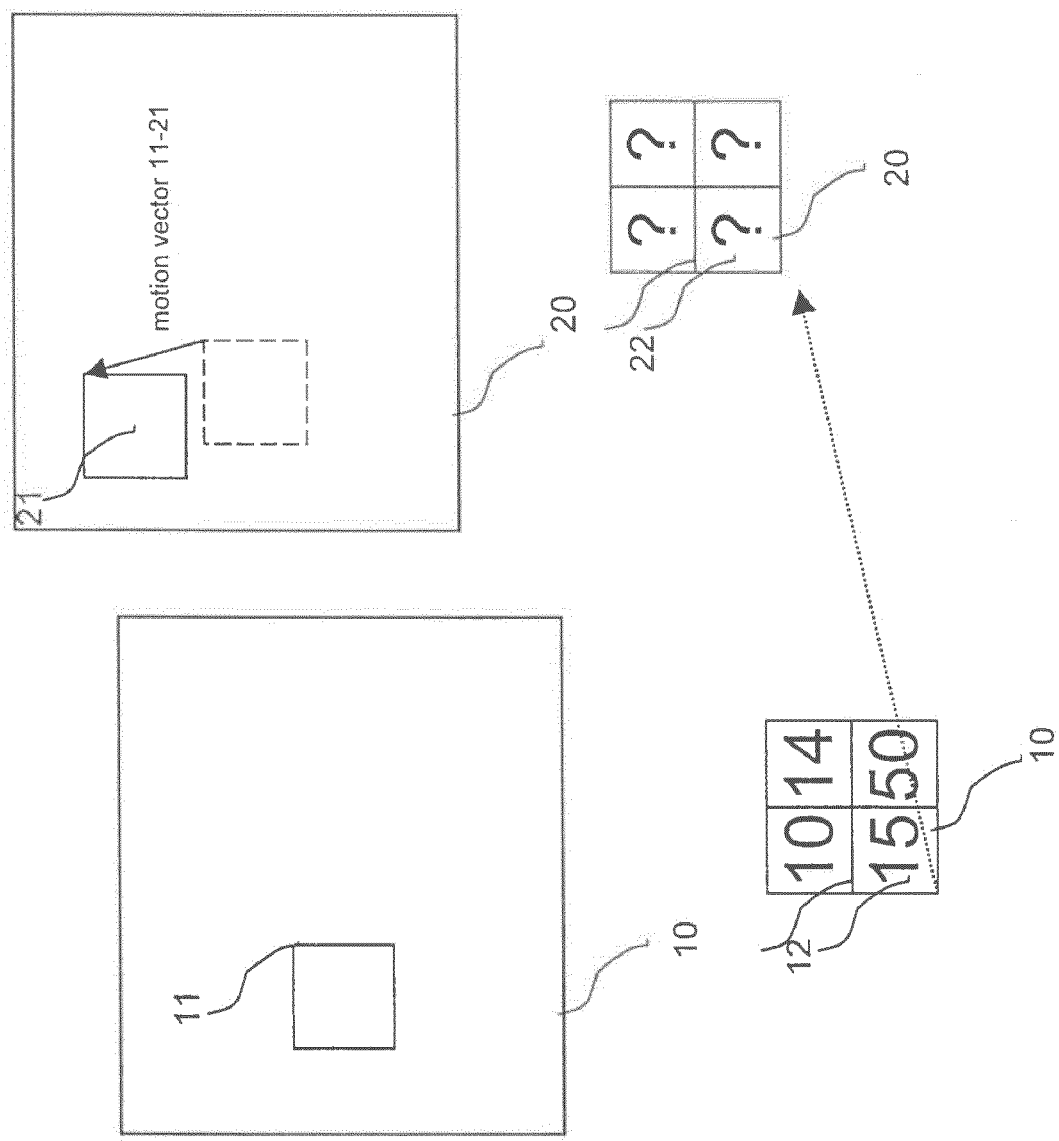
FIG. 1 is a block diagram illustrating the basic intention of finding the motion vector.

FIG. 1 is a block diagram illustrating the basic intention of finding the motion vector. In an image 10 a block 11 is located having pixels 12, wherein each pixel has a pixel value. In another image 20 with a different exposure the pixel values of block 11 will correspond to pixel values of pixels 22 of a block 21 with those pixel values of block 21 being different to the pixel values of block 11 due to the different exposure between images 10 and 20. If however there is motion between image 20 and image 10, this change in pixel values correlates also with a movement of the corresponding blocks within the plane of the image and can only be determined if the motion vector 11-21 between image 10 and image 20 is known.

Figure 2:
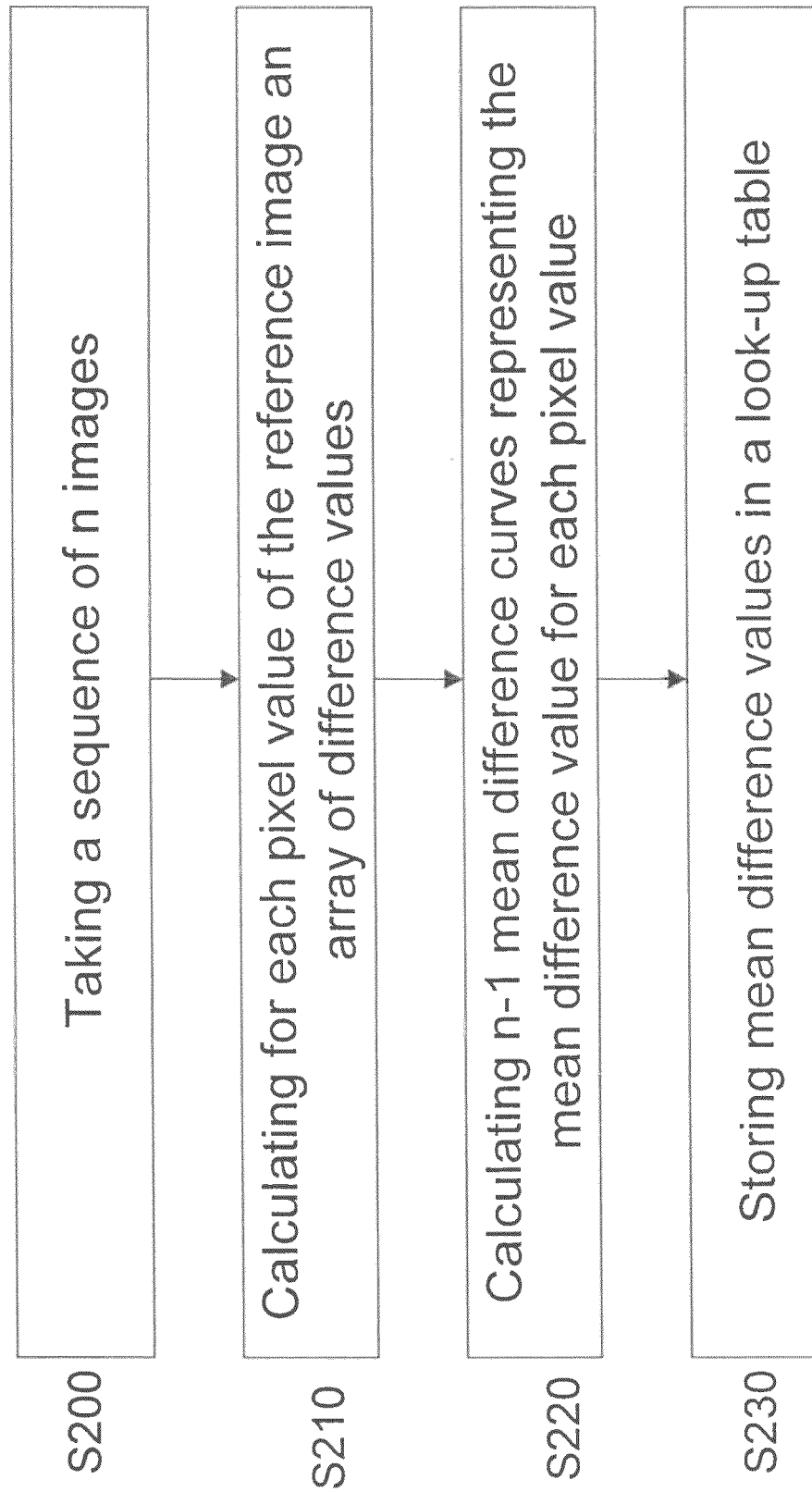
FIG. 2 is a block diagram illustrating a method for generating a HDR image.

FIG. 2 is a block diagram illustrating a method for generating a mean difference curve. In step S200 a sequence of n images is taken with a camera without local or global motion in order to generate an ideal "reference case" and can be realized with the camera mounted on a tripod. One of these images is chosen as a reference image and the others serve as auxiliary or further images, wherein an exposure value for the reference image is named eV0 and for the further images eV1, eV-1, eV2, etc. Then it is noted, how a certain pixel value, which might appear several times within the reference image, changes between reference image and a further image by a difference value, which is not necessarily constant for all pixels of the reference image. In step S210 for each pixel value of the reference image a plurality of difference values for a further image is determined and grouped as an array. In step S220 for each of the n-1 references (transitions) between the reference image and the n-1 further images a difference curve is calculated. This difference curve represents a graph which indicates a mean difference value for each pixel value. This mean difference value is calculated as a mean value from the difference values of the array of the pixel value. In a step 230 the mean difference values are stored as these mean difference curves in a look-up table, which is then used for the camera with which the values have been calculated.

As shown in FIG. 3a a sequence of n images is taken with different exposure values eVx, wherein the difference in exposure might derive from a difference in exposure time or a difference in aperture size. This has to happen without local or global motion in order to generate an ideal "reference case". Therefore any motion during taking the images should be avoided, e.g. by taking the images with a tripod. One of these n images is determined to be used as a reference image while the other n-1 images are used as further images for calculating differences in their pixel values relative to the pixel values of the reference image. Thereby the term pixel value comprises information on the radiance. Pixel values might be for example 0 to 255.

In an embodiment of the method an image could be chosen as the reference image, which is not the image with the highest or the lowest exposure, in order to use the effect of improving the range both for dark and for bright areas with similar efficiency. Afterwards a difference is considered for each pixel value within the reference image, wherein the difference values from reference image to the n-1 further images are determined.

FIG. 3b shows how a pixel value (in the example the considered pixel value is "10") is varied during transitions from the reference image to the further images with exposure values eV1, etc.

So for each pixel value of the reference image an array of difference values is calculated for n-1 transitions (from the reference image to n-1 further images). For example in FIG. 3b the transition from eV0 to eV1 of pixel value 10 results in pixel values 14, 13 and 15. The resulting array of difference values for pixel value 10 is shown in FIG. 4a for transition to eV1 and in FIG. 4b for transition to eV2. This calculation is possible in a direct comparison of the pixels, since there is no movement within the sequence of images. The calculation is done for all n-1 transitions from reference image to the n-1 further images. Afterwards each array is "shrinked" to one value being the mean difference value of the corresponding pixel value.

While FIGS. 4a and 4b show arrays only for pixel value 10, the corresponding FIGS. 5a and 5b take for the array at pixel value 10 and for each further array of other pixel values one mean value, so that a curve is generated, which indicates one mean difference value for each pixel value. This curve shown in FIGS. 5a and 5b for transitions from the reference image to the further image with exposure value eV1 and to the further image with exposure value eV2 is also called mean difference curve.

Figure 6:
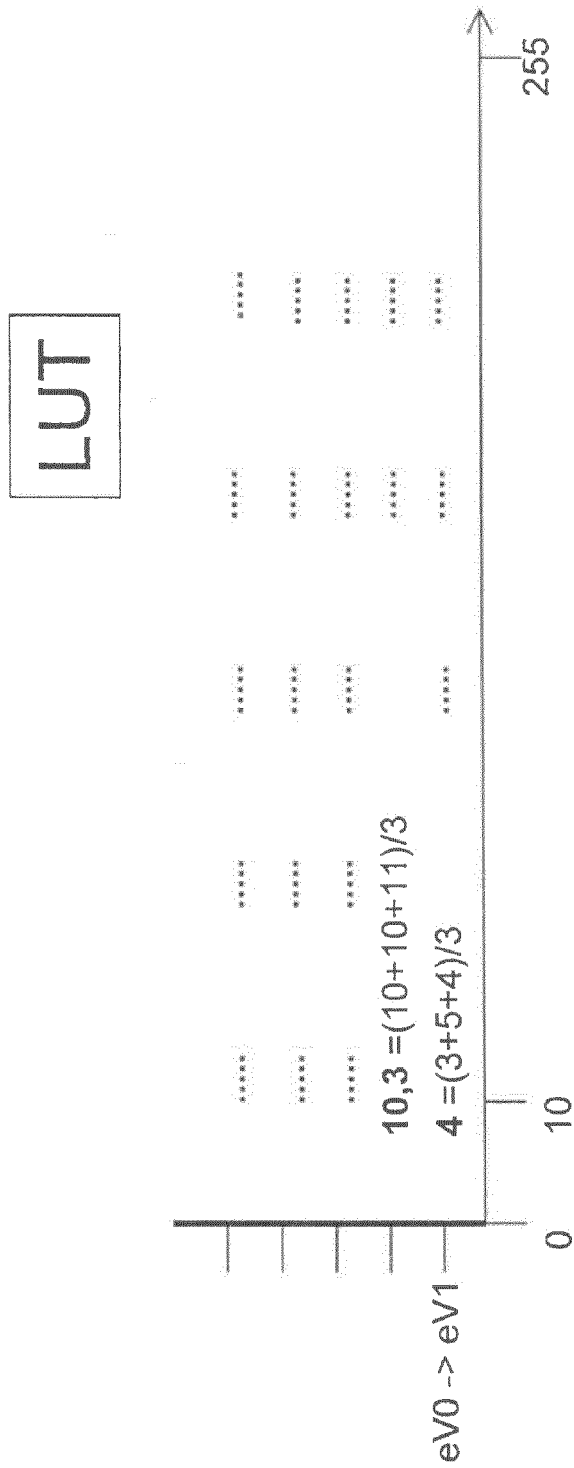
FIG. 6 shows the mean difference values of all transitions for each pixel value and is the final look-up table to be stored.

FIG. 6 shows a look-up table LUT with all mean difference values for the n-1 transitions (on the y-axis) for pixel values 0 to 255 to be filled in. For reasons of easier illustrations there are only two mean difference values for two different transitions illustrated for pixel value 10. If such look-up table were filled in continuously it could also be shown as a three-dimensional graph spanned above the plane of the different transitions (y-axis of FIG. 6) over the pixel values (x-axis of FIG. 6). This look-up table is then stored and it is possible to store a plurality of look-up tables for a plurality of different focal lengths and/or different ISO sensitivities.

A higher number n of different exposure images tends to provide a better weighting.

When HDR images are taken with a handheld camera and there is motion within the image sequence, alignment of the images is necessary before merging them to create an HDR image. If the images, with local or global motion, were not aligned with each other, there would be artifacts in the created HDR image.

As already explained above the look-up table is generated once for an image taking unit, e.g. a photo camera. Once being generated the look-up table can be used for aligning a sequence of images taken by the same camera even including motion.

So, once knowing the luminance-exposure-dependency represented by the look-up table, the alignment of a sequence of images for creation of an HDR image can be done without artifacts, even with motion within the sequence of different exposure images, and does not necessarily use further manual tuning of any parameters.

As already indicated, different look-up tables for different focal lengths and for different ISO sensitivities can be stored for one camera.

One use of the look-up table is illustrated in FIG. 7 showing a method for creating a high dynamic range image according to a further embodiment of the invention. The sequence of images taken for creating a HDR image is aligned by use of the look-up table and after linearization of the aligned images the images can be blended to result in one HDR image without causing artifacts.

In FIG. 7 the look-up table is already known by taking the first sequence of images without motion as described above and shown in FIG. 2. Then in step S710 with the same camera a sequence of images is taken. In step S720 this taken sequence is aligned based on the look-up table already known for this camera. A further step S730 of linearizing the aligned images may follow. In step S740 the images are blended in order to generate a HDR image.

This method might also be applied to video frames.

Furthermore, as shown in FIG. 8, the look-up table can also be used for some kind of "artificial HDR" image creation by generating different exposure images from a single image with no further need for alignment before blending. Blending of this artificially generated sequence will enhance the contrast of the original single image. In an analogous manner also HDR video can be created artificially by applying the method to a single frame thereby generating artificial different exposure frames for blending which will enhance the contrast of the original single frame.

Accordingly also in FIG. 8 the look-up table is already known by taking the first sequence of images without motion as described above and shown in FIG. 2. Then in step S810 with the same camera a single image is taken. In step S820 from this taken single image a plurality of artificial further images is generated on the basis of the look-up table already known for this camera. In step S830 the taken single image and the artificially created further images are blended in order to generated a HDR image.

This method might also be applied to video frames.

FIG. 9 shows a generation unit 100 for generating a high dynamic range image. This generation unit comprises an imaging unit 110 which is configured to take images or a sequence of n images of an object with different exposures. Since it is necessary that the object, the imaging unit and the surrounding remains static with respect to each other for taking this first initializing sequence, the imaging unit or the generation unit may be arranged on a tripod not shown in FIG. 9.

The generation unit may also comprise a first processor 120 configured to calculate for each pixel value of the reference image arrays containing n−1 difference values, each array corresponding to one of the n−1 further images and a second processor 130 configured to calculate a mean difference curve for each of the n−1 further images, wherein each mean difference curve represents a mean difference value for each pixel value. The first and the second processor may also be combined as one processor. Further the generation unit 100 may comprise a storage 140 which is configured to store the mean difference values, which are represented for each pixel value and for each of the n−1 further images in a look-up table.

The storage 140 may be configured to store look-up tables for different focal lengths and/or different ISO sensitivities.

The generation unit 100 may further comprise an aligning unit 200 configured to align the images based on the look-up table and a blending unit 400 configured to blend the images.

The generation unit 100 may also comprise a linearizing unit 300 configured to linearize the images after their alignment.

The generation unit 100 may further comprise an image creating unit 500 configured to create a plurality of further images from a single image based on the look-up table, which can also be blended by the blending unit 400.

Although specific embodiments have been illustrated and described herein, it will be appreciated by those of ordinary skill in the art that a variety of alternate and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method for processing image data comprising:
   taking with a camera a first sequence of n images of an object with different exposures wherein the object and the camera remain static with respect to each other, wherein the sequence contains one reference image with pixel values and n−1 further images with n≧2, the reference image and the further images having pixels, wherein each pixel has a pixel value;
   calculating for each pixel value of the reference image n−1 arrays containing x difference values, each of the n−1 arrays corresponding to one of the n−1 further images, wherein x is the number of times a considered pixel value appears in the reference image;
   calculating n−1 mean difference curves, each mean difference curve representing a mean difference value for each pixel value for each of the n−1 further images; and
   storing the mean difference values represented by the mean difference curve for each pixel value and for each of the n−1 further images in a look-up table.

2. The method for processing image data according to claim 1, further comprising
   taking a second sequence of images with the camera;
   aligning the images based on the look-up table to generate linearized images; and
   blending the linearized images to generate a high dynamic range image.

3. The method for processing image data according to claim 1, further comprising:
   taking a single image;
   creating a plurality of further images from the single image based on the look-up table; and
   blending the single image and the further images to one image.

4. The method for processing image data according to claim 2, further comprising;
   taking another second sequence of images with the camera wherein the object and the camera remain static with respect to each other; and
   blending the images based on the look-up table.

5. The method for processing image data according to claim 1, wherein the difference between different exposures is derived from a difference in exposure times.

6. The method for processing image data according to claim 1, wherein the difference between different exposures is derived from a difference in aperture size.

7. A method for generating a high dynamic range video comprising:
   taking a sequence of video frames; and
   creating a plurality of further video frames from each video frame according to the method of claim 3, wherein each video frame is processed as a single image.

8. An apparatus for processing image data comprising:
   an imaging unit configured to take a sequence of n images of an object with different exposures wherein the object and the imaging unit remain static with respect to each other and wherein the sequence contains one reference image with pixel values and n−1 further images with n≧2, the reference image and the further images having pixels, wherein each pixel has a pixel value;
   a first processor configured to calculate for each pixel value of the reference image n−1 arrays containing x difference values, each arrays corresponding to one of the n−1 further images, wherein x is the number of times a considered pixel value appears in the reference image;
   a second processor configured to calculate n−1 mean difference curves for each of the n−1 further images, each mean difference curve representing a mean difference value for each pixel value for each of the n−1 further images; and a storage configured to store the mean difference values represented by the mean difference curve for each pixel value and for each of the n−1 further images in a look-up table.

9. The apparatus according to claim 8, wherein the storage is configured to store look-up tables for different focal lengths and/or different ISO sensitivities.

10. The apparatus according to claim 8, further comprising:

an aligning unit configured to align the images based on the look-up table to generate linearized images; and a blending unit configured to blend the linearized images to generate a high dynamic range image.

11. The apparatus according to claim 8, further comprising:

an image creating unit configured to create a plurality of further images from a single image based on the look-up table; and a blending unit configured to blend the single image and the further images to one image.

12. A non-transitory computer readable medium including computer program instructions that cause a computer to execute a method to process image data, the method comprising:

taking with a camera a sequence of n images of an object with different exposures wherein the object and a camera remain static with respect to each other, wherein the sequence contains one reference image and n−1 further images with $n \geq 2$, the reference image and the further images having pixels, wherein each pixel has a pixel value;

calculating for each pixel value of the reference image n−1 arrays containing x difference values, each of the n−1 arrays corresponding to one of the n−1 further images, wherein x is the number of times a considered pixel value appears in the reference image;

calculating n−1 mean difference curves, each mean difference curve representing a mean difference value for each pixel value for each of the n−1 further images; and storing the mean difference values represented by the mean difference curve for each pixel value and for each of the n−1 further images in a look-up table.

* * * * *